(12) United States Patent
Holly et al.

(10) Patent No.: US 8,299,924 B2
(45) Date of Patent: *Oct. 30, 2012

(54) METHOD AND APPARATUS FOR LOCATING OBJECTS USING RADIO FREQUENCY IDENTIFICATION

(75) Inventors: Sandor Holly, Woodland Hills, CA (US); Robert Alan Smith, Hampton Cove, AL (US)

(73) Assignee: The Boeing Company, Chicago, IL (US)

( * ) Notice: Subject to any disclaimer, the term of this patent is extended or adjusted under 35 U.S.C. 154(b) by 1385 days.

This patent is subject to a terminal disclaimer.

(21) Appl. No.: 11/758,787

(22) Filed: Jun. 6, 2007

(65) Prior Publication Data

US 2012/0146767 A1 Jun. 14, 2012

(51) Int. Cl.
*G08B 13/14* (2006.01)
(52) U.S. Cl. ............... 340/572.1; 340/568.1; 340/539.1; 340/10.1
(58) Field of Classification Search .... 340/572.1–572.9, 340/568.1, 539.1, 933, 10.1, 5.92, 825.49
See application file for complete search history.

(56) References Cited

U.S. PATENT DOCUMENTS

| | | | |
|---|---|---|---|
| 3,745,575 A | 7/1973 | Kikuchi | |
| 3,775,765 A | 11/1973 | Di Piazza et al. | |
| 3,831,173 A | 8/1974 | Lerner | |
| 5,327,139 A | 7/1994 | Johnson | |
| 5,457,394 A | 10/1995 | McEwan | |
| 5,506,590 A * | 4/1996 | Minter | 342/462 |
| 5,512,834 A | 4/1996 | McEwan | |
| 5,668,342 A | 9/1997 | Discher | |
| 5,819,859 A | 10/1998 | Stump et al. | |
| 5,900,833 A | 5/1999 | Sunlin et al. | |
| 6,057,765 A | 5/2000 | Jones et al. | |
| 6,060,815 A * | 5/2000 | Nysen | 310/318 |
| 6,094,157 A | 7/2000 | Cowdrick | |
| 6,163,259 A | 12/2000 | Barsumian et al. | |
| 6,438,468 B1 | 8/2002 | Muxlow et al. | |
| 6,501,414 B2 | 12/2002 | Arndt et al. | |
| 6,522,285 B2 | 2/2003 | Stolarczyk et al. | |
| 6,545,945 B2 | 4/2003 | Caulfield | |
| 6,671,589 B2 | 12/2003 | Holst et al. | |
| 6,765,527 B2 | 7/2004 | Jablonski et al. | |
| 6,795,754 B2 | 9/2004 | Sunami et al. | |

(Continued)

FOREIGN PATENT DOCUMENTS

WO  WO 00/77614 A2  12/2000

(Continued)

OTHER PUBLICATIONS

U.S. Appl. No. 12/504,923, filed Jul. 16, 2009, Holly et al.
U.S. Appl. No. 12/412,919, filed Mar. 27, 2009, Holly et al.
U.S. Appl. No. 12/481,941, filed Jun. 10, 2009, Burns et al.
U.S. Appl. No. 11/758,785, filed Jun. 6, 2007, Holly et al.
Wilson et al., "Improvised Explosive Devices (IEDs) in Iraq and Afghanistan: Effects and Countermeasures", CRS Report for Congress, updated Nov. 21 2007, pp. 1-6.

(Continued)

*Primary Examiner* — Daniel Previl
(74) *Attorney, Agent, or Firm* — Yee & Associates, P.C.

(57) ABSTRACT

A method and apparatus for detecting non-linear tags. In one advantageous embodiment a system for detecting non-linear tags has a transmitter and a receiver. The transmitter transmits a plurality of electromagnetic signals having a first frequency and a second frequency. The receiver monitors for an electromagnetic signal having a frequency equal to a difference between the first frequency and a second frequency that is generated by a non-linear tag in response to receiving the plurality of electromagnetic signals, wherein the non-linear tag is detected when the electromagnetic signal is detected by the receiver.

20 Claims, 3 Drawing Sheets

U.S. PATENT DOCUMENTS

| | | | |
|---|---|---|---|
| 6,864,825 B2* | 3/2005 | Holly | 342/13 |
| 6,894,624 B2* | 5/2005 | Kim et al. | 340/933 |
| 6,897,777 B2 | 5/2005 | Holmes et al. | |
| 6,943,742 B2 | 9/2005 | Holly | |
| 6,950,076 B2 | 9/2005 | Holly | |
| 6,999,041 B2 | 2/2006 | Holly | |
| 7,009,575 B2* | 3/2006 | Holly et al. | 343/820 |
| 7,130,624 B1 | 10/2006 | Jackson et al. | |
| 7,142,147 B2* | 11/2006 | Holly | 342/13 |
| 7,162,285 B2 | 1/2007 | Owens et al. | |
| 7,190,302 B2 | 3/2007 | Biggs | |
| 7,366,589 B2 | 4/2008 | Habermas | |
| 7,473,898 B2 | 1/2009 | Holly et al. | |
| 7,486,250 B2 | 2/2009 | Vetrovec et al. | |
| 7,500,238 B2 | 3/2009 | Nestoryak | |
| 7,512,511 B1 | 3/2009 | Schultz et al. | |
| 7,515,094 B2 | 4/2009 | Keller, III | |
| 7,528,762 B2 | 5/2009 | Cerwin | |
| 7,557,710 B2* | 7/2009 | Sanchez et al. | 340/572.1 |
| 7,636,568 B2 | 12/2009 | Gould et al. | |
| 7,769,501 B2 | 8/2010 | Lusardi et al. | |
| 7,777,671 B2 | 8/2010 | Schnitzer et al. | |
| 7,778,213 B2 | 8/2010 | Alrabady et al. | |
| 7,827,549 B2 | 11/2010 | Tarassov | |
| 7,893,862 B2 | 2/2011 | Holly et al. | |
| 8,015,794 B2 | 9/2011 | Winkler et al. | |
| 8,035,550 B2 | 10/2011 | Holly et al. | |
| 8,051,031 B2 | 11/2011 | Sims, III et al. | |
| 8,054,212 B1 | 11/2011 | Holly et al. | |
| 8,055,393 B2 | 11/2011 | Sime, III et al. | |
| 2002/0011947 A1 | 1/2002 | Stolarczyk et al. | |
| 2002/0111720 A1 | 8/2002 | Holst et al. | |
| 2002/0175849 A1 | 11/2002 | Arndt et al. | |
| 2003/0028899 A1 | 2/2003 | MacInnis | |
| 2003/0041236 A1 | 2/2003 | Nestoryak | |
| 2005/0026609 A1 | 2/2005 | Brinkley et al. | |
| 2005/0064922 A1 | 3/2005 | Owens et al. | |
| 2005/0200550 A1 | 9/2005 | Vetrovec et al. | |
| 2006/0082488 A1 | 4/2006 | Keller | |
| 2006/0109159 A1 | 5/2006 | Holly | |
| 2006/0206587 A1 | 9/2006 | Fabbrocino | |
| 2007/0013577 A1* | 1/2007 | Schnitzer et al. | 342/90 |
| 2007/0024489 A1 | 2/2007 | Cerwin | |
| 2007/0046791 A1 | 3/2007 | Wang et al. | |
| 2008/0127171 A1 | 5/2008 | Tarassov | |
| 2008/0127175 A1 | 5/2008 | Naranjo et al. | |
| 2008/0295090 A1 | 11/2008 | Bestle et al. | |
| 2009/0040093 A1 | 2/2009 | Holly et al. | |
| 2009/0198393 A1 | 8/2009 | Sims, III et al. | |
| 2009/0198712 A1 | 8/2009 | Sims, III et al. | |
| 2011/0231150 A1 | 9/2011 | Burns et al. | |

FOREIGN PATENT DOCUMENTS

| | | |
|---|---|---|
| WO | WO 2006/110991 A1 | 10/2006 |
| WO | 2009099710 A1 | 8/2009 |

OTHER PUBLICATIONS

Thomas, "Common Airborne Instrumentation System: A Fresh Look", Accession No. ADA392006, Naval Air Warfare Center Aircraft Div Patuxent River MD, Jul. 2001.

Brada, "Metadata Support for Safe Component Upgrades", Proc. of Compsac '02, 26th Annual Intl Computer Software & Applications Conf., Oxford England, IEEE Aug. 2002.

USPTO office action for U.S. Appl. No. 12/026,918 dated Feb. 3, 2011.

USPTO office action for U.S. Appl. No. 12/026,926 dated Mar. 14, 2011.

U.S. Appl. No. 11/551,369, filed Oct. 20, 2006, Winkler et al.

USPTO Office Action dated Aug. 26, 2011 for U.S. Appl. No. 11/758,785.

USPTO Office Action dated Aug. 21, 2009 for U.S. Appl. No. 12/167,753, pp. 10.

USPTO Final Office Action dated Jan. 5, 2010 for U.S. Appl. No. 12/167,753, pp. 8.

USPTO Office Action dated Jul. 9, 2010 for U.S. Appl. No. 12/167,753, pp. 5.

USPTO Notice of Allowance dated Oct. 18, 2010 for U.S. Appl. No. 12/167,753, pp. 7.

USPTO Office Action dated Apr. 28, 2010 for U.S. Appl. No. 12/026,918, pp. 22.

USPTO Final Office Action dated Aug. 27, 2010 U.S. Appl. No. 12/026,918, pp. 14.

USPTO Notice of Allowance dated Jul. 22, 2011 for U.S. Appl. No. 12/026,918, pp. 10.

USPTO Office Action dated Oct. 19, 2010 for U.S. Appl. No. 12/026,926, pp. 16.

USPTO Notice of Allowance dated Sep. 13, 2011 for U.S. Appl. No. 12/412,919, pp. 20.

USPTO Office Action dated Dec. 7, 2011 for U.S. Appl. No. 12/504,293, pp. 21.

USPTO Final Office Action dated Feb. 10, 2012 for U.S. Appl. No. 11/758,785, pp. 5.

USPTO Notice of Allowance dated Jul. 13, 2011 for U.S. Appl. No. 12/026,926, pp. 9.

USPTO Office Action dated Feb. 10, 2012 for U.S. Appl. No. 12/481,941, pp. 26.

PCT search report dated Mar. 6, 2009 regarding PCT/US2009/030652, 3 pages.

PCT Application No. PCT/US2009/030652, filed Jan. 9, 2009, 32 pages

USPTO final office action dated Mar. 20, 2012 regarding U.S. Appl. No. 12/504,293, 13 pages.

USPTO notice of allowance dated May 24, 2012 regarding U.S. Appl. No. 12/481,941, 7 pages.

* cited by examiner

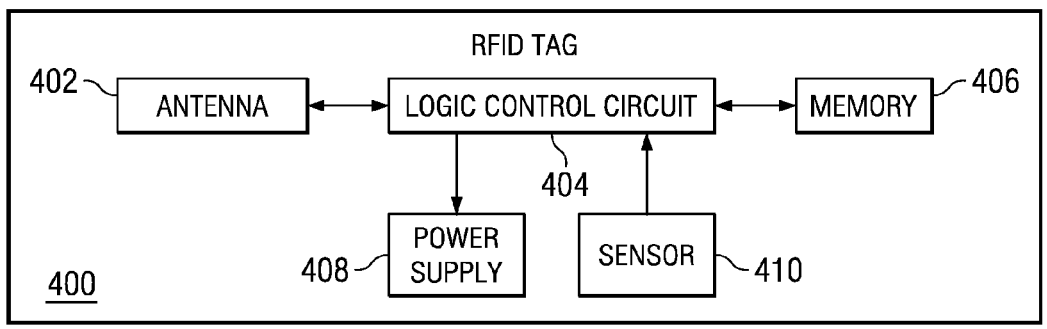
FIG. 4
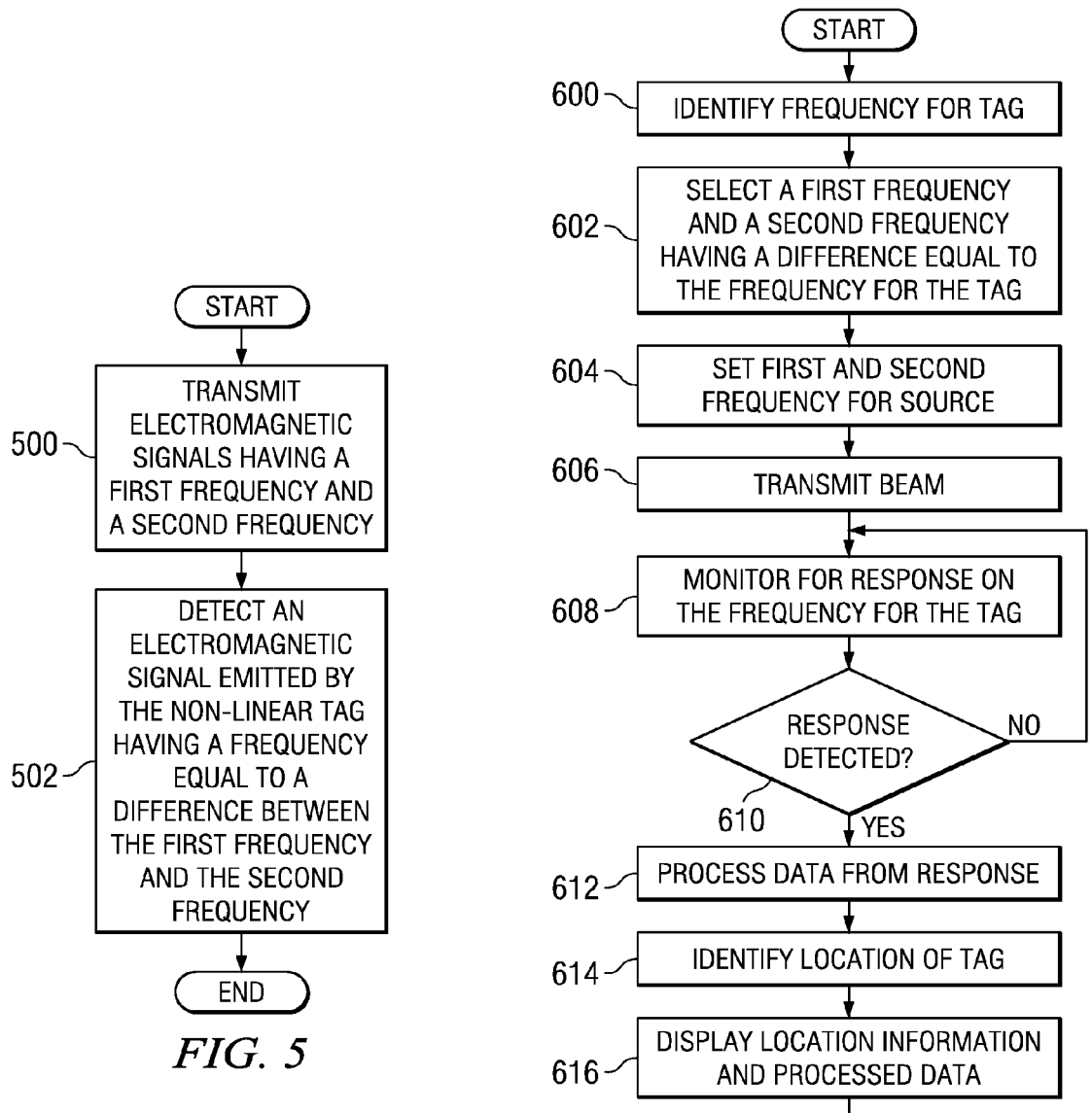
FIG. 5
FIG. 6

METHOD AND APPARATUS FOR LOCATING OBJECTS USING RADIO FREQUENCY IDENTIFICATION

CROSS REFERENCE TO RELATED APPLICATION

The present invention is related to the following patent application: entitled "Method and Apparatus for Using Non-Linear Ground Penetrating Radar to Detect Objects Located in the Ground", Ser. No. 11/758,785; filed even date hereof, assigned to the same assignee, and incorporated herein by reference.

BACKGROUND INFORMATION

1. Field

The present invention relates generally to identifying objects and in particular, the present invention relates to a method and apparatus for using electromagnetic signals to identify objects. Still more particularly, the present invention relates to a method and apparatus for identifying objects associated with non-linear radio frequency identification tags.

2. Background

Radio frequency identification (RFID) is an identification method that relies on storing and remotely retrieving data using devices called radio frequency identifier tags or transponders. A radio frequency identifier tag is an object that can be attached or incorporated into an object, such as a product, an animal, or person for the purpose of identification using radio waves. Currently, three different types of radio frequency identifier tags are present, passive tags, active tags, and semi-passive tags. A passive tag has no internal power supply. The incoming radio frequency signal provides the power needed for the circuit in the tag to power up and transmit a response.

Many passive tags generate a signal by back scattering the carrier signal from the reading. In other words, an antenna is designed to both collect power from the incoming signal and transmit the outbound back scatter signal. An active tag has an internal power supply that is used to power different circuits to generate or to control the outgoing backscattered signal. These types of tags are typically more reliable than passive tags.

Further, these types of tags are also able to transmit at higher power levels than passive tags because of the power supply located within the tag. As a result, active tags are more efficient in environments such as water, metal, and at longer distances. A semi-passive radio frequency identification tag uses an internal power source to monitor environmental conditions. This type of tag, however, requires radio frequency energy transferred to it from the reader interrogator to provide a response.

Currently used radio frequency identification systems have a limited range for identifying objects. Problems in range are encountered because of the frequency ranges used by currently available radio frequency identification systems. Lower frequency systems are typically in the 30 KHz to 500 KHz ranges. High frequency radio frequency identification systems use frequencies between 850 MHz to 950 MHz and 1.5 GHz to 2.4 GHz. These types of systems offer longer ranges that may reach around 100 meters. Within these ranges, the amount of power that may be transmitted by the radio frequency identification systems to identify tags are often limited by regulations to avoid interference with other devices that may operate in the same frequency bands.

The current ranges available are adequate in many applications, such as inventory control. The range, however, prevents the use of radio frequency identifiers in other applications that require longer ranges. For example, locating a lost individual or a downed pilot may require ranges of over a kilometer to make such a system effective.

SUMMARY

The advantageous embodiments of the present invention provide a method and apparatus for detecting non-linear tags. In one advantageous embodiment a system for detecting non-linear tags has a transmitter and a receiver. The transmitter transmits a plurality of electromagnetic signals having a first frequency and a second frequency. The receiver monitors for an electromagnetic signal having a frequency equal to a difference between the first frequency and a second frequency that is generated by a non-linear tag in response to receiving the plurality of electromagnetic signals, wherein the non-linear tag is detected when the electromagnetic signal is detected by the receiver.

In another advantageous embodiment, a method for detecting tags includes transmitting a plurality of electromagnetic signals having a first frequency and a second frequency. Monitoring is performed for an electromagnetic signal having a frequency equal to a difference between the first frequency and a second frequency, wherein the electromagnetic signal is generated by a non-linear tag in response to receiving the plurality of electromagnetic signals. A tag having a non-linear element is detected when the electromagnetic signal is detected.

Another advantageous embodiment includes a non-linear tag that comprises a non-linear element, and a logic circuit. The non-linear element receives electromagnetic signals that have a first frequency and a second frequency. The logic circuit causes the non-linear element to emit information in a response signal having a frequency equal to a difference between the first frequency and the second frequency in response to the non-linear element receiving the electromagnetic signals.

The features, functions, and advantages can be achieved independently in various embodiments of the present invention or may be combined in yet other embodiments in which further details can be seen with reference to the following description and drawings.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an advantageous embodiment of the present invention when read in conjunction with the accompanying drawings, wherein:

FIG. 4 is a diagram illustrating an active radio frequency identification tag in accordance with an advantageous embodiment of the present invention;

FIG. 5 is a flowchart of a process for detecting a non-linear tag in accordance with an advantageous embodiment of the present invention; and FIG. 6 is a flowchart of a process for collecting data from a radio frequency identification tag having a non-linear element in accordance with an advantageous embodiment of the present invention.

DETAILED DESCRIPTION

Figure 1:
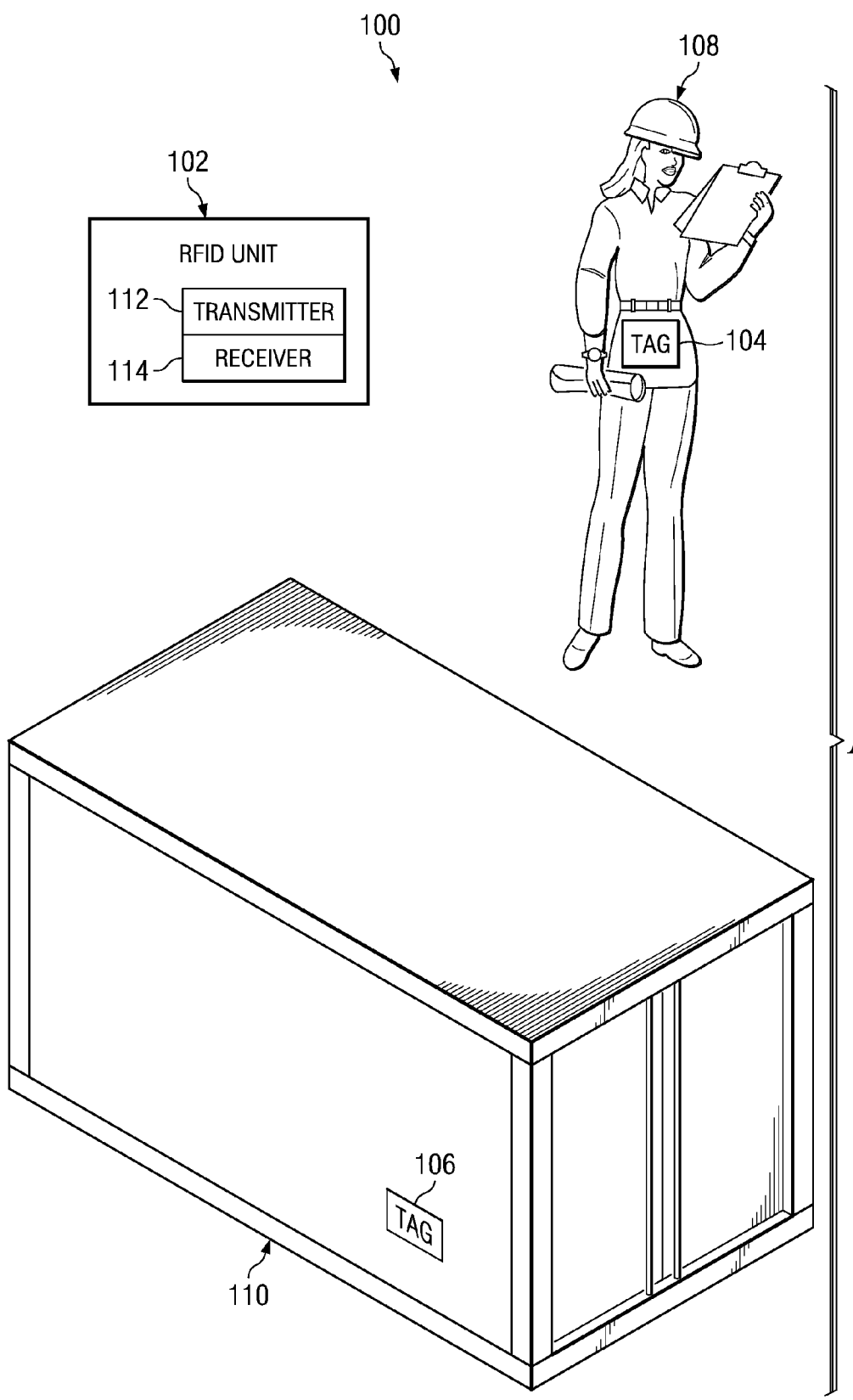
FIG. 1 is a diagram illustrating a radio frequency identification system in accordance with an advantageous embodiment of the present invention.

With reference now to the figures, and in particularly with reference to FIG. 1, a diagram illustrating a radio frequency identification system is depicted in accordance with an advantageous embodiment of the present invention. The different illustrative embodiments recognize that identifying objects from a distance, such as 100 meters or farther may be a daunting task with respect to the currently available radio frequency identification systems. Further, the different embodiments also recognize that the identification of fast moving objects, objects in the dark, and objects behind walls also provide additional challenges to identifying objects using radio frequency identification technology. As a result, the different advantageous embodiments of the present invention employ a new class of radio frequency identification tags.

The advantageous embodiments of the present invention provide a method and apparatus for detecting non-linear tags. A system is provided for detecting non-linear tags. This system has a transmitter and a receiver. The transmitter transmits a plurality of electromagnetic signals having a first frequency and a second frequency. The receiver monitors for an electromagnetic signal having a frequency equal to a difference between the first frequency and a second frequency that is generated by a non-linear tag in response to receiving the plurality of electromagnetic signals. The non-linear tag is detected when the electromagnetic signal is detected by the receiver.

In this example, radio frequency identification system 100 includes radio frequency identification (RFID) unit 102. This unit is used to identify objects that carry tags. In this example, tags 104 and 106 are attached to or incorporated into objects 108 and 110, respectively. In these examples, object 108 is a person and object 110 is a shipping container. These objects may take other various forms, depending on the implementation. For example, these objects may be equipment, vehicles, animals, or persons.

Tags 104 and 106, in these examples, are non-linear radio frequency identification tags. A non-linear radio frequency identification tag is any circuit or element that can receive electromagnetic signals having a first frequency and a second frequency. In response to receiving these two different frequencies, a non-linear radio frequency identification tag emits an electronic signal having a frequency equal to the difference between the first frequency and the second frequency. This signal may include data stored in the non-linear radio frequency identification tag.

Radio frequency identification unit 102 contains transmitter 112 and receiver 114. In these illustrative examples, transmitter 112 and receiver 114 are shown as part of radio frequency identification unit 102. Depending on the particular implementation, transmitter 112 and receiver 114 may be located in separate physical devices.

Transmitter 112 is configured to transmit electromagnetic signals having the first frequency and the second frequency. Receiver 114 is configured to receive signals having a frequency, which is the difference between the first frequency and the second frequency.

In these illustrative embodiments, transmitter 112 transmits these signals in the form of a radiation pattern, in the case of a millimeter wave collimator as the antenna for example, in the shape of a collimated beam. These signals may be directed, rather than radiating a signal over a broad area as with current radio frequency identification systems. A collimated beam is a tight bundle of propagating waves, whose divergence is determined by strict physical laws.

In these depicted examples, a frequency may be selected in which restrictions on the power for the frequency are not present. For example, rather than selecting a frequency in the megahertz or 1 GHz range, signals in the 100 GHz range may be used by transmitter 112. By transmitting these signals at a higher power level, transmitter 112 has a greater range than otherwise with a lower power transmission.

Additionally, the frequencies used by transmitter 112 may be selected such that these frequencies do not interfere or cause problems with the circuitry in receiver 114 by avoiding, for example, difference frequencies that are harmonically related to the two outgoing, transmitted frequencies. As a result, a higher power may be used by transmitter 112 to transmit electromagnetic signals at the two different frequencies.

Further, by using a beam, the location of an object also may be identified in addition to the presence of the object. When a beam generated by transmitter 112 is pointed at object 108, tag 104 generates a response signal with a signal that is at a frequency that is the difference between the first and second frequency generated by transmitter 112. Receiver 114 identifies the transmission of this response signal by tag 104. By knowing the direction of the beam, radio frequency identification unit 102 may determine the location of object 108.

Figure 2:
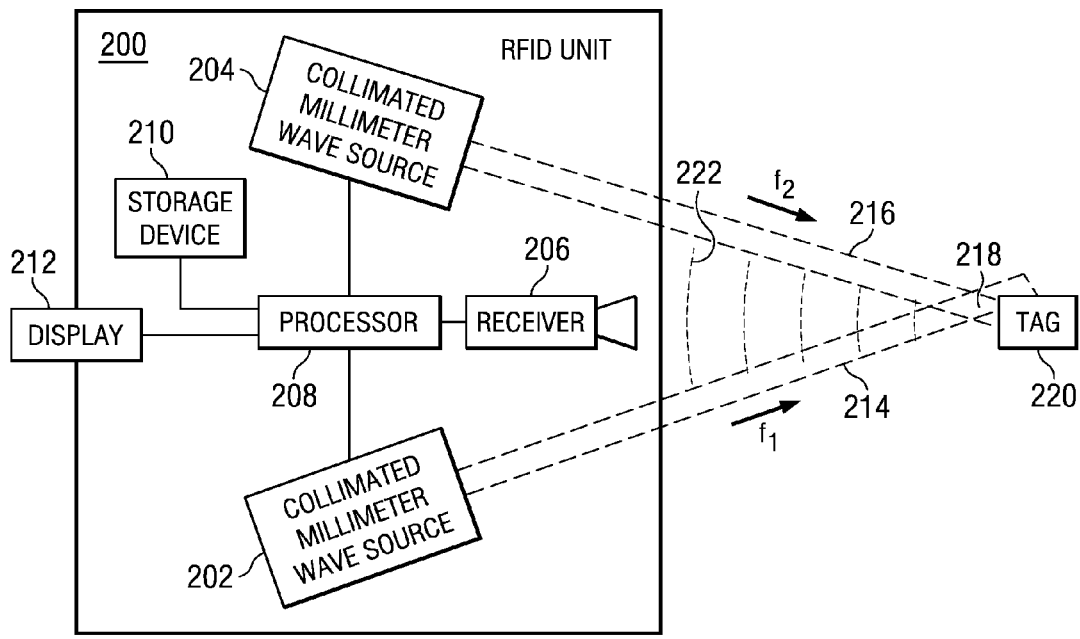
FIG. 2 is a diagram of a radio frequency identification unit in accordance with an advantageous embodiment of the present invention.

With reference next to FIG. 2, a diagram of a radio frequency identification unit is depicted in accordance with an advantageous embodiment of the present invention. In this example, radio frequency identification (RFID) unit 200 is a more detailed illustration of radio frequency identification unit 102 in FIG. 1.

In this particular embodiment, radio frequency identification unit 200 contains collimated millimeter wave source 202 and collimated millimeter wave source 204. These wave sources generate electromagnetic signals that are in the form of beams. In these examples, the beams are collimated millimeter wave beams. Collimated millimeter wave source 202 and collimated millimeter wave source 204 are examples of components found in a transmitter, such as transmitter 112 in FIG. 1.

Radio frequency identification unit 200 also includes receiver 206. In these examples, receiver 206 receives signals that may be emitted by a radio frequency identification tag.

Processor 208 controls collimated millimeter wave source 202, collimated millimeter wave source 204, and receiver 206. Instructions used by processor 208 to control these components are located in storage device 210. Display 212 may present information to a user of radio frequency identification unit 200. For example, display 212 may generate an indication when a response signal is generated.

As depicted, collimated millimeter wave source 202 generates electromagnetic signals in the form of electromagnetic beam 214 while collimated millimeter wave source 204 generates electromagnetic signals in the form of electromagnetic beam 216. Beams 214 and 216 converge at zone 218. In these illustrative examples, beam 214 is an electromagnetic beam having a first frequency f1, while beam 214 is an electromagnetic beam having a second frequency f2. These two beams designate a difference frequency of $\Delta f$ in these examples. Difference frequency $\Delta f$ is the difference between frequency f1 and frequency f2 in this particular example. Tag 220 is located within zone 218. Zone 218 is a volume of space that is illuminated by both beams 214 and 216.

In response to receiving the electromagnetic signals in beams 214 and 216 at the two different frequencies, tag 220 generates a response that is a difference between the first frequency, f1 in beam 214 and the second frequency, f2 in beam 216. This response is returned as response signal 222 in these examples. Response signal 222 consists of electromagnetic signals that have a frequency of $\Delta f$. This frequency may then be detected by receiver 206 to identify the presence of tag 220.

Additionally, the location of tag 220 also may be identified because of the use of beams to generate zone 218. Processor 208 may calculate the location of zone 218 based on the location of radio frequency identification unit 200 and the direction of beam 214 and beam 216 and the time it takes for response signal 222 to be received.

In these illustrative examples, beams 214 and 216 generated by collimated millimeter wave sources 202 and 204 are at much higher frequencies than the operating frequency of tag 220. In these examples, beams 214 and 216 have frequencies typically in the 100 GHz range or higher.

With these types of electromagnetic wave sources, radio frequency identification unit 200 may direct beams 214 and 216 within an area that causes zone 218 to move within the area by moving or changing the direction of beams 214 and 216 in radio frequency identification unit 200. Further, as the operating frequency of collimated millimeter wave source 202 and 204 increased, the high spatial resolution occurs for radio frequency identification unit 200 also increases.

In these illustrative examples, tag 220 contains a non-linear element that results in a transmission of response signal 222. The non-linear elements in tag 220, in these examples, are designed to emit response signal 222 at a particular frequency. In these examples, this frequency is equal to the difference frequency or $\Delta f$ between the first frequency f1 and the second frequency f2 of the radiation incident on the tag. As a result, if the first frequency f1 and the second frequency f2 do not have a difference frequency that the non-linear element is designed to transmit at, response signal 222 is not generated by tag 220. In this manner, particular tags or types of tags may be identified using radio frequency identification unit 200. For example, if the different frequency configured for the non-linear element in tag 220 is 12 megahertz and the difference between frequency f1 and frequency f2 is 10 megahertz, tag 220 does not generate response signal 222.

Further, in some cases, tag 220 also may transmit data, such as an identification of the object to which tag 220 is affixed. Other types of data that may be returned by tag 220 in response signal 222 may include, for example, a heart rate or a temperature when the object takes the form of a human. Other information that may be returned by tag 220 also include, for example, predefined information, such as an identification of a container, the contents of the container, and the origination source of the container. The information returned by tag 220 and signal 222 may be merely a number that is used as an identifier for the tag.

Figure 3:
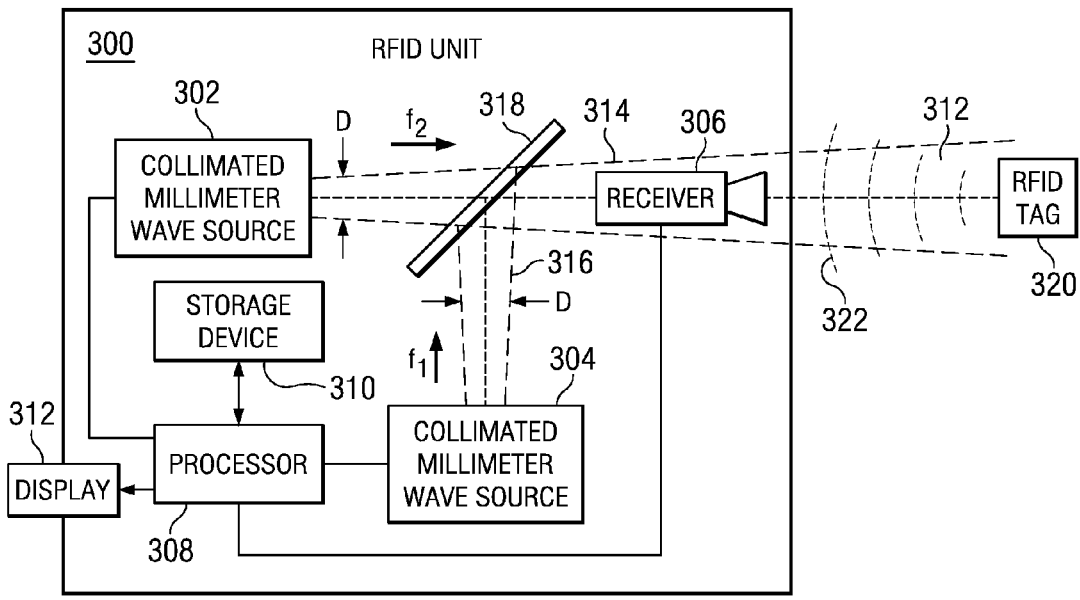
FIG. 3 is a diagram illustrating a transmitter for a radio frequency identification system in accordance with an advantageous embodiment of the present invention.

Turning next to FIG. 3, a diagram illustrating a transmitter for a radio frequency identification system is depicted in accordance with an advantageous embodiment of the present invention. Radio frequency identification unit (RFID) 300 is an example of another configuration that may be used in radio frequency identification unit 102 in FIG. 1.

In this particular example, radio frequency identification unit 300 includes collimated millimeter wave source 302, collimated millimeter wave source 304, and receiver 306. Radio frequency identification unit 300 also includes processor 308, storage device 310, and display 312.

Processor 308 operates to control collimated millimeter wave source 302 and collimated millimeter wave source 304. Further, processor 308 receives data for signals detected by receiver 306. Processor 308 executes instructions that may be located in storage device 310. Results of response signals detected by receiver 306 may be presented on display 312.

In this example, radio frequency identification unit 300 generates electromagnetic signals in the form of a single beam, beam 312. Beam 312 is generated through a combination of beams 314 and 316 which are generated by collimated millimeter wave source 302 and collimated millimeter wave source 304, respectively. Collimated millimeter wave source 304 generates beam 316 with a first frequency f1. Collimated millimeter wave source 302 generates beam 314 with a second frequency f2. These two beams are combined into beam 312 using polarization beam combiner 318.

Beam 312 is in essence a combined circularly polarized beam with an interference difference frequency. This interference difference frequency is the difference between frequency f1 generated by collimated millimeter wave source 304 and frequency f2 generated by collimated millimeter wave source 302. Beam 312 may be directed at a target, such as radio frequency identification tag 320.

When radio frequency identification tag 320 receives beam 312, a response in the form of response signal 322 is generated and emitted by radio frequency identification tag 320. As in FIG. 2, radio frequency identification tag 320 generates response signal 322 with a frequency that is the difference between frequency f1, generated by collimated millimeter wave source 304 and frequency f2, generated by collimated millimeter wave source 302.

Response signal 322 is detected by receiver 306 which sends the information in return signal 322 to processor 308 for processing. Processor 308 may store information received in return signal 322 in storage device 310. Additionally, processor 308 may display this information in display 312 in radio frequency identification unit 300.

The information returned by radio frequency identification tag 320 may be merely an indication that the tag is present. Alternatively, an identifier stored in radio frequency identification tag 320 also may be returned with response signal 322. Other information, such as information monitored or obtained by a sensor in radio frequency identification tag 320 also may be returned within response signal 322. The particular information returned depends on the particular implementation.

With radio frequency identification unit 300, beam 312 is a directed beam that may be used to search an area that has a radius or diameter for beam 312. As a result, when a signal, such as response signal 322 is received by receiver 306, a user of radio frequency identification unit 300 is able to identify the location of radio frequency identification tag 320.

The user of radio frequency identification unit 300 is able to identify the location of radio frequency identification tag 320 because radio frequency identification unit 300 transmits signals in the form of beam 312. When response signal 322 is received, the user knows where the beam is pointed and can identify the location of radio frequency identification tag 320. For example, if beam 312 is pointed at a vehicle and response signal 322 is received, the user knows that radio frequency identification tag 320 is located on or in the vehicle.

The collimated millimeter wave sources used in the radio frequency identification units in FIGS. 2 and 3 may be implemented using any available collimated millimeter wave source. More information on these types of wave sources and their configurations may be found in U.S. Pat. No. 6,864,825 B2 and U.S. Pat. No. 7,142,147 B2.

Turning now to FIG. 4, a diagram illustrating a radio frequency identification tag is depicted in accordance with an advantageous embodiment of the present invention. A radio frequency identification tag is also referred to as a transponder. Radio frequency identification tag (RFID) 400 is a more detailed example of tag 220 in FIG. 2 and tag 320 in FIG. 3. Radio frequency identification tag 400 is a non-linear radio frequency identification tag in these examples.

As depicted in this illustrative example, radio frequency identification tag 400 includes antenna 402, logic control circuit 404, memory 406, power supply 408, and sensor 410. Antenna 402, in these examples, is the non-linear element that receives electromagnetic pulses at the two different frequencies. The difference between the two frequencies is the frequency at which antenna 402 transmits a response signal in these examples. A unique feature on antenna 402, in these examples, is that it is designed to be responsive at three different frequencies, f1, f2 and $\Delta f$.

Upon detecting electromagnetic signals at the first frequency and a second frequency, logic control circuit 404 causes antenna 402 to emit a reply for a return signal with a frequency that is equal to the difference between the first frequency and the second frequency. In this example, antenna 402 is the element having a non-linear electrical property. Logic control circuit 404 may send information stored in memory 406 through antenna 402 in response to receiving the electromagnetic signals having the first frequency and the second frequency. This information is transmitted in the response signal by modulating the response signal, such that the response signal contains a series of bits in these examples.

Memory 406 may include pre-stored information, such as an identifier for the tag. Other examples of pre-stored information may include an identification of a container or the contents of a container. Memory 406 also may include other information recorded by logic control circuit 404 through sensor 410. This information is called acquired information and may include, for example, temperature, heart beat, and humidity. This data may be real time data detected by sensor 410.

Power supply 408 increases the range at which radio frequency identification tag 400 may transmit information. Further, power supply 408 allows radio frequency identification tag 400 to store more information and process data detected by sensor 410. In this example, radio frequency identification tag 400 is an active non-linear tag. If radio frequency identification tag 400 takes the form of a semi-active non-linear tag, power supply 408 is only used to power logic control circuit 404, memory 406, and sensor 410.

In the illustrative examples, radio frequency identification tag 400 may be attached to an object, such as a pilot. If the aircraft that a pilot is operating crashes or the pilot is forced to eject from the aircraft, radio frequency identification tag 400 allows the pilot to be located from distances that are longer than normally provided through conventional radio frequency identification systems.

The projection of a beam is similar to a flashlight because the beam only covers a selected area rather than generally radiating outward. If a response signal is generated by radio frequency identification tag 400, the user knows that only a limited area is present in which radio frequency identification tag 400 can be located. By knowing the divergent characteristics of the beam, such as how large of a beam footprint is generated over different distances, the user can identify the location of radio frequency identification tag 400 when radio frequency identification tag 400 generates a response.

Further, the location of an object associated with radio frequency identification tag 400 may be identified through the response made by radio frequency identification radio frequency identification tag 400. This location of the tag is made possible by transmitting a beam containing the two different frequencies rather than generally transmitting a signal in an area. When a reading is obtained, the user knows the direction at which the beam is directed and can locate radio frequency identification tag 400 and the object to which radio frequency identification tag 400 is attached or embedded.

In these examples, antenna 402 may be a typical antenna used in a radio frequency identification tag. In this depicted example, antenna 402 is configured to be responsive to the first frequency f1, the second frequency f2, and the difference frequency $\Delta f$ in addition to having non-linear components, such as diodes distributed along the structure of antenna 402. Alternatively, antenna 402 may take other forms such as, for example, a diode or a varactor. If other non-typical components are used for antenna 402, logic control circuit 404 detects the current induced by the component used to form antenna 402 when electromagnetic signals are received by a component at two different frequencies at which the difference is the frequency at which the antenna is designed to transmit signals.

Turning now to FIG. 5, a flowchart of a process for detecting a non-linear tag is depicted in accordance with an advantageous embodiment of the present invention. The process illustrated in FIG. 5 may be implemented in a radio frequency identification unit, such as radio frequency identification unit 300 in FIG. 3. In particular, instructions to execute these processes may be implemented in a processor, such as processor 308 in FIG. 3.

The process begins by transmitting an electromagnetic signal having a first frequency and a second frequency (operation 500). In these examples, this electromagnetic signal is a continuous wave radio frequency signal. An example of another type of signal that may be used in addition to a continuous wave radio frequency signal is a pulsed wave radio frequency signal. Another example of a signal that may be used is periodically frequency sweeping both f1 and f2 in a way to maintain a constant $\Delta f$ or difference frequency. In response, an electromagnetic signal emitted by the non-linear tag having a frequency equal to the difference of the first frequency and the second frequency is detected (operation 502) with the process terminating thereafter.

Turning now to FIG. 6, a flowchart of a process for collecting data from a radio frequency identification tag having a non-linear element is depicted in accordance with an advantageous embodiment of the present invention. The process illustrated in FIG. 6 may be implemented in a radio frequency identification unit, such as radio frequency identification unit 300 in FIG. 3. In particular, the different operations depicted in FIG. 6 may be executed by a processor, such as processor 308 in FIG. 3.

The process begins by identifying a frequency for the tag (operation 600). Thereafter, a first frequency and a second frequency are selected in which these two frequencies have a difference equal to the frequency for the tag (operation 602). The first frequency and the second frequency identified in operation 602 are set for the sources in the radio frequency identification unit (operation 604). In these examples, the sources are collimated millimeter wave sources.

Next, a beam is transmitted (operation 606). In this example, the beam is a combined beam in which one beam in the combined beam has the first frequency and the second beam in the combined beam has the second frequency. This transmitted beam may be transmitted as a single combined beam originating from the radio frequency identification unit. Alternatively, the beam may be two beams that combine in a zone.

The process monitors for a response on the frequency for the tag (operation 608). This monitoring is done using a receiver in the radio frequency identification unit, such as receiver 306 in FIG. 3. A determination is made as to whether a response is detected (operation 610). If a response is not detected, the process returns to operation 608.

Otherwise, the process processes the data from the response (operation 612). The processing of data in operation 612 may take different forms. For example, the processing of data may be merely the presence of the response being detected. In other implementations, the processing of data may include receiving an identifier from the radio frequency identification tag generating a response. The data also may take the form of data collected by the tag. For example, if the tag is associated with a person, the tag may transmit a temperature or heart beat data. This data may be sent in real time to indicate that the person, associated with the tag, is alive. Another example is temperature data for a container associated with a tag. This type of data may include a temperature for a container in which the temperature for the container should be within some specified range to maintain the stability of the contents within the container.

The process identifies the location of the tag (operation 614). The location of the tag forms location information. This location information may be identified based on the direction of the beam and the response received from the tag. The response time of the response and information in the response also may be used to identify the location of the tag. The process then displays location information and processed data (operation 616) with the process terminating thereafter. In these examples, the location information in the processed data may be presented on a display, such as display 312 in FIG. 3. The processed data displayed may be, for example, an indication that the object has been located. Alternatively, an identifier for the object may be displayed. Other information, such as information gathered by the tag also may be displayed. For example, a heart beat rate may be displayed in association with the identification of the object.

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

Thus, the different advantageous embodiments The advantageous embodiments of the present invention provide a method and apparatus for detecting non-linear tags. In one advantageous embodiment a system for detecting non-linear tags has a transmitter and a receiver. The transmitter a plurality of electromagnetic signals having a first frequency and a second frequency. The receiver monitors for an electromagnetic signal having a frequency equal to a difference between the first frequency and a second frequency that is generated by a non-linear tag in response to receiving the plurality of electromagnetic signals, wherein the non-linear tag is detected when the electromagnetic signal is detected by the receiver.

In the different examples, the non-linear tag comprises a non-linear element, and a logic circuit. The non-linear element receives electromagnetic signals that have a first frequency and a second frequency. The logic circuit causes the non-linear element to emit information in a response signal having a frequency equal to a difference between the first frequency and the second frequency in response to the non-linear element receiving the electromagnetic signals.

The description of the present invention has been presented for purposes of illustration and description, and is not intended to be exhaustive or limited to the invention in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the invention, the practical application, and to enable others of ordinary skill in the art to understand the invention for various embodiments with various modifications as are suited to the particular use contemplated.

What is claimed is:

1. A system for detecting non-linear radio frequency identification tags, the system comprising:
   a transmitter, wherein the transmitter transmits a plurality of electromagnetic signals having a first frequency and a second frequency; and
   a receiver, wherein the receiver monitors for an electromagnetic signal having a third frequency equal to a difference between the first frequency and the second frequency, wherein the electromagnetic signal is generated by a non-linear tag in response to the non-linear tag receiving the plurality of electromagnetic signals, wherein the non-linear tag comprises an antenna, a logic control circuit, a memory, a power supply, and a sensor, and wherein the non-linear tag is detected when the electromagnetic signal at the third frequency is detected by the receiver.

2. The system of claim 1, wherein the transmitter comprises:
   a first collimated millimeter wave source transmits first signals in the plurality of electromagnetic signals having the first frequency, wherein the first signals are collimated; and
   a second collimated millimeter wave source that transmits second signals in the plurality of electromagnetic signals having the second frequency, wherein the second signals are collimated.

3. The system of claim 2, wherein the first signals and the second signals converge to form a zone where the first signals and the second signals overlap.

4. The system of claim 2, wherein the first signals and the second signals are combined into a single beam.

5. The system of claim 1, wherein the plurality of electromagnetic signals having the first frequency and the second frequency are continuous wave radio frequency signals.

6. The system of claim 1, wherein the third frequency is pre-selected to identify the non-linear tag.

7. A non-linear tag comprising:
   a non-linear element, wherein the non-linear element receives electromagnetic signals, and wherein the electromagnetic signals comprise a first frequency and a second frequency; and a logic circuit, wherein the logic circuit causes the non-linear element to emit information in a response signal having a third carrier frequency equal to a difference between the first frequency and the second frequency in response to the non-linear element receiving the electromagnetic signals.

8. The non-linear tag of claim 7 further comprising:
a storage device connected to the logic circuit, wherein information in the response signal is stored in the storage device.

9. The non-linear tag of claim 7, wherein the logic circuit modulates the response signal to include the information.

10. The non-linear tag of claim 7 further comprising:
a power source.

11. The non-linear tag of claim 7 further comprising:
a sensor connected to the logic circuit, wherein the sensor generates information usable to modulate the response signal.

12. The non-linear tag of claim 11, wherein the non-linear tag acquires the information from an object associated with the non-linear tag.

13. The non-linear tag of claim 7, wherein the non-linear element is part of an antenna structure containing a plurality of non linear elements.

14. The non-linear tag of claim 7, wherein the non-linear element is selected from one of a diode and a varactor.

15. A method for detecting tags, the method comprising:
transmitting a plurality of electromagnetic signals having a first frequency and a second frequency; and
monitoring for an electromagnetic signal generated by a non-linear tag, wherein the electromagnetic signal comprises a third carrier frequency equal to a difference between the first frequency and the second frequency, and wherein the non-linear tag generates the electromagnetic signal in response to receiving the plurality of electromagnetic signals, wherein the non-linear tag comprises an antenna, a logic control circuit, a memory, a power supply, and a sensor; and
detecting a tag having a non-linear element when the electromagnetic signal is detected.

16. The method of claim 15, wherein the transmitting step comprises:
transmitting a first beam having the first frequency from a first electromagnetic wave source; and
transmitting a second beam having the second frequency from a second electromagnetic wave source.

17. The method of claim 16, wherein the first beam and the second beam intersect to form a zone comprising a volume where the first beam and the second beam intersect.

18. The method of claim 16, wherein the first beam and the second beam are combined into a single beam.

19. The method of claim 16, wherein the first electromagnetic wave source is a first collimated millimeter wave source and the second electromagnetic wave source is a second collimated millimeter wave source.

20. The method of claim 15, wherein the electromagnetic signal includes at least one of an identifier for an object associated with the tag and information acquired by the tag.

* * * * *